C. OLSON.
COOKING UTENSIL.
APPLICATION FILED SEPT. 20, 1920.

1,385,265.

Patented July 19, 1921.

INVENTOR.
Carl Olson
BY
ATTORNEY

UNITED STATES PATENT OFFICE.

CARL OLSON, OF FOSTER CITY, MICHIGAN.

COOKING UTENSIL.

1,385,265.  Specification of Letters Patent.  Patented July 19, 1921.

Application filed September 20, 1920. Serial No. 411,451.

*To all whom it may concern:*

Be it known that I, CARL OLSON, a citizen of the United States, residing at Foster City, Dickinson county, Michigan, have invented certain new and useful Improvements in Cooking Utensils, of which the following is a specification.

My invention relates to cooking utensils and has particular reference to kettles and the like. The object of the present improvement is to provide in a simple and inexpensive construction a preventive against boiling over; to assist circulation of the boiling liquid, and to facilitate a rapid drainage of the boiling fluid from comparatively solid boiled contents. And with the above named general object in view my invention consists in the novel construction of cooking utensil hereinafter described in detail, illustrated in the accompanying drawing and more particularly pointed out in the appended claims.

In the drawing—

Figure 1:
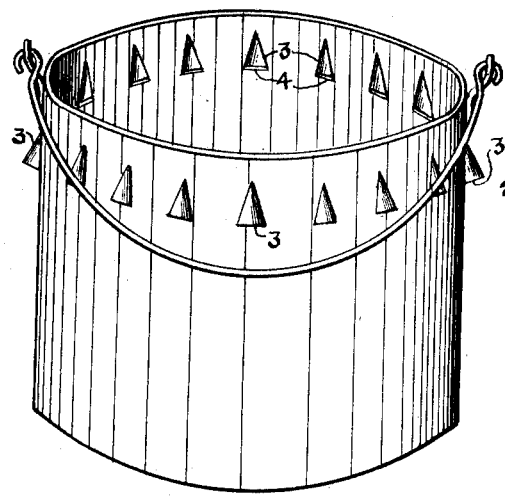
Figure 1 is a perspective view of the inner vessel of my invention.
Figure 2:
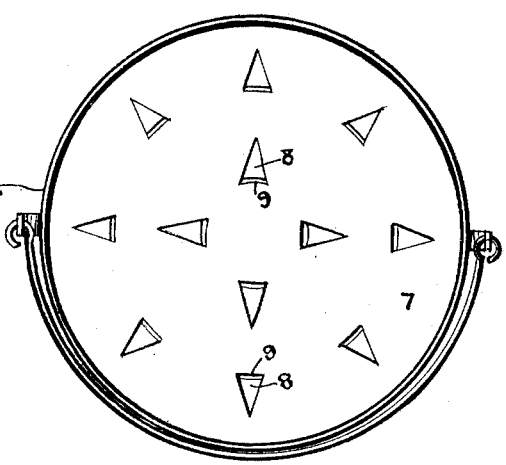
Fig. 2 is a top plan view of same.
Figure 3:
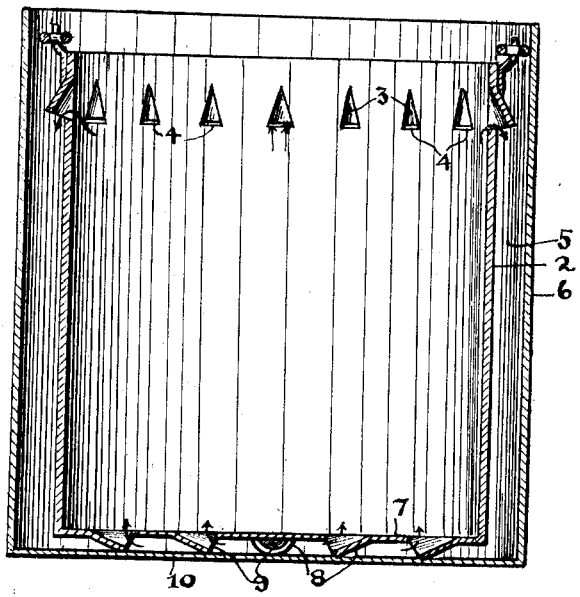
Fig. 3 is a vertical section of an embodiment of my invention.

In the several views 2 represents the body of a kettle with my improvement applied thereto and to be used in connection with any suitable ordinary kettle or vessel. The body 2 is shown of plain cylindrical form for the purpose of illustrating my invention, but any other acceptable form is equally available. Near the top of the body 2 is a suitable number of struck-out projections which are preferably of triangular form the base of each triangle, or struck-out portion, being severed from the body 2 to provide a downwardly directed opening 4, or outlet from the trough-like part 3, which directs overflows through the openings 4 into a circumferential space 5 between an outer plain vessel 6 (Fig. 3) and the vessel 2 toward the latter's bottom 7 in which are struck-out portions 8, all directed toward the center of the vessel, as shown, and providing bottom openings 9 that are similar to the openings 4, but guide a boiling current on the bottom —10— of the outer vessel 6 upwardly into the kettle 2, the latter being supported on the projections 8. When the vessel 2 is lifted out of the vessel 6 the boiling fluid is quickly drained from comparatively solid contents through the openings 9, the outflows being directed toward each other and toward the center of the vessel 6 thereby obviating spilling over the sides of the vessel 6. The proportionate size of the outer vessel 6 may be varied to provide more or less space 5, or, in other words, different sizes of vessel 6 may be employed in connection with the vessel 2, according to special requirements. Ordinarily, however, but a small annular space 5 is required.

Having thus described my invention, I claim as new and desire to secure by Letters Patent:—

1. The combination with an outer vessel, of an inner vessel having its walls spaced apart from said outer vessel, said inner vessel having downwardly projected side openings near its top and similar openings in its bottom directed toward the center of the vessel.

2. The combination of an outer and an inner kettle, said inner vessel having its sides and bottom spaced apart from the sides and bottom of said outer vessel, and a series of laterally projected and downwardly directed openings near the top and downwardly and angularly directed openings in the bottom of said inner vessel.

In testimony whereof I have hereunto signed my name.

CARL OLSON.